United States Patent [19]

Kraemer et al.

[11] Patent Number: 4,521,858
[45] Date of Patent: Jun. 4, 1985

[54] FLEXIBLE ADDRESSING AND SEQUENCING SYSTEM FOR OPERAND MEMORY AND CONTROL STORE USING DEDICATED MICRO-ADDRESS REGISTERS LOADED SOLELY FROM ALU

[75] Inventors: Alan D. Kraemer, Tustin; James A. Kane, Santa Ana, both of Calif.

[73] Assignee: Technology Marketing, Inc., Irvine, Calif.

[21] Appl. No.: 474,271

[22] Filed: Mar. 11, 1983

Related U.S. Application Data

[63] Continuation of Ser. No. 151,740, May 20, 1980, abandoned.

[51] Int. Cl.³ .......................... G06F 9/24; G06F 9/28; G06F 9/36; G06F 9/26
[52] U.S. Cl. .................................. 364/200
[58] Field of Search ... 364/200 MS File, 900 MS File

[56] References Cited

U.S. PATENT DOCUMENTS

| | | | |
|---|---|---|---|
| 3,497,630 | 2/1970 | Lucas | 364/200 |
| 3,766,527 | 10/1973 | Briley | 364/200 |
| 3,949,378 | 4/1976 | Crabb | 364/200 |
| 4,016,546 | 4/1977 | Bennett | 364/200 |
| 4,042,911 | 8/1977 | Bourke | 364/900 |
| 4,124,891 | 11/1978 | Weller, III et al. | 364/200 |
| 4,172,281 | 10/1979 | Gordon | 364/200 |
| 4,202,035 | 5/1980 | Lane | 364/200 |
| 4,223,381 | 9/1980 | Rozell | 364/200 |
| 4,224,668 | 9/1980 | Peters et al. | 364/200 |
| 4,228,498 | 10/1980 | Moshier | 364/200 |
| 4,231,084 | 10/1980 | Yoshizaki et al. | 364/200 |
| 4,231,089 | 10/1980 | Lewine et al. | 364/200 |
| 4,237,535 | 12/1980 | Wiedenman | 364/200 |
| 4,237,543 | 12/1980 | Nishio et al. | 364/900 |
| 4,247,893 | 1/1981 | Anderson et al. | 364/200 |
| 4,249,239 | 2/1981 | Mescam et al. | 364/200 |
| 4,250,545 | 2/1981 | Blahut et al. | 364/200 |
| 4,254,461 | 3/1981 | Chemla et al. | 364/200 |
| 4,258,419 | 3/1981 | Blahut | 364/200 |
| 4,268,902 | 5/1981 | Berglund et al. | 364/200 |
| 4,306,287 | 12/1981 | Huang | 364/200 |
| 4,312,034 | 1/1982 | Gunter et al. | 364/200 |
| 4,317,170 | 2/1982 | Wada et al. | 364/200 |
| 4,323,964 | 4/1982 | Gruner | 364/200 |
| 4,339,796 | 7/1982 | Brereton | 364/200 |
| 4,348,724 | 9/1982 | Cushing | 364/200 |
| 4,367,524 | 1/1983 | Budde | 364/200 |
| 4,370,709 | 1/1983 | Fosdick | 364/200 |
| 4,373,182 | 2/1983 | Schultz | 364/200 |
| 4,379,328 | 4/1983 | Catiller | 364/200 |
| 4,383,297 | 5/1983 | Wheatley | 364/200 |
| 4,430,711 | 2/1984 | Anderson et al. | 364/200 |
| 4,434,465 | 2/1984 | McDonough et al. | 364/200 |
| 4,449,184 | 5/1984 | Pohlman, III et al. | 364/200 |

Primary Examiner—James D. Thomas
Assistant Examiner—A. E. Williams, Jr.
Attorney, Agent, or Firm—Knobbe, Martens, Olson & Bear

[57] ABSTRACT

A microprocessor computer includes a control store ROM, which is flexibly addressed, using a sequence register and base register, both of which are loaded from the microprocessor data loop. The sequence register and microinstruction register, the latter providing a pipeline for output control store microinstructions, are selectively accessed by a multiplexer. The output of this multiplexer, along with the output of the base register, provide the inputs to an adder which may selectively address a microinstruction in the control store, as specified by the output of the multiplexer, or as specified by the sum of the addresses from the multiplexer and the base register. The flexible address, in addition to addressing the control store, provides an address to microoperand storage in a high speed RAM. This allows local storage of data that must be processed by the microprocessor under microprogram control in high through-put real time applications. The use of the multiplexer and adder permits flexible addressing of both microinstruction words and micro-operands in the control store by permitting the address to be specified by (a) the microinstruction register; (b) the sequence register; (c) the sum of the base and sequence register; or (d) the sum of the base and microinstruction register. This flexibility of addressing permits loop strings to be implemented in the control store and allows two-dimensional data arrays to be addressed in the micro-operand RAM.

12 Claims, 2 Drawing Figures

FLEXIBLE ADDRESSING AND SEQUENCING SYSTEM FOR OPERAND MEMORY AND CONTROL STORE USING DEDICATED MICRO-ADDRESS REGISTERS LOADED SOLELY FROM ALU

This is a continuation of Ser. No. 151,740, filed 5/20/1980, abandoned.

BACKGROUND OF THE INVENTION

This invention relates to microprocessors, and more particularly, to microinstruction and operand addressing in microprocessors.

Prior microprocessors have typically included a control store which provides a class of microinstructions to address the control store itself, and a second class of microinstructions to address the main computer memory to read and write operands in memory.

It has also been typical to provide a variety of alternate addressing sources for the control store ROM. For example, such sources have included registers connected to the main data bus and loaded by the arithmetic logic unit; incrementing logic for addressing successive microinstructions; and address register stacks used to store return addresses when nested looping operations were undertaken.

Typically, the second class of microinstructions in the microinstruction register, supplied by the control store, which provides the next operand address, has imposed significant delays on system operation. Since operands, especially substantial arrays of operands which could not be stored in simple register structures, have typically been addressed in the main memory of the system, using multiple address commands from the control store, the cycle time for manipulating such data has been relatively long. This has posed significant problems when the microprocessor is used for real time applications requiring extremely high through-put of data.

In such applications, the time required in the prior art was further increased by the fact that the operand was typically addressed by a first microinstruction, and a second microinstruction defining the manipulation of that operand was typically addressed in a successive microcycle, so that plural microinstruction steps were required to address and manipulate the data, effectively wasting microcycles during the fetching and storing of the operands.

While indirect addressing techniques are known in the prior art, such as, for example, techniques which allow offsetting of a microinstruction address provided by the microinstruction register, the prior art has not provided flexible addressing which will permit an address provided by the arithmetic logic unit to be offset by a base, also provided by the arithmetic logic unit, to permit loop strings of microinstructions to be implemented or two-dimensional arrays of operand data to be addressed.

SUMMARY OF THE INVENTION

The microprocessor of the present invention includes a control store ROM and a microsequencer for providing addresses to the control store ROM, which elements are similar to those utilized in the prior art. The microsequencer includes a microprogram counter used for incrementing the microinstruction address and a register stack used for storing return microinstruction addresses during looping operations. These elements, as well as a micro-address register and an input address bus, provide inputs to a multiplexer which selects one of them as the address source for the next microinstruction to be accessed from the control store.

Microinstructions accessed from the control store are placed in a microinstruction register for execution. Some of the bits of the microinstruction register are connected to the microsequencer to define the source of the next input address and to control the operations of the microprogram counter, register stack, register, and multiplexer within the microsequencer.

A different set of bits of the microinstruction register is provided, through a pipeline buffer, to the input address bus of the microsequencer for selection, by the multiplexer within the microsequencer, as a source of address signals for the control store. The pipeline buffer thus supplies jump and call addresses for the microsequencer.

Thus, this portion of the present microprocessor which is identical to the prior art provides some flexibility in control store addressing.

The present invention significantly increases this flexibility by providing a multiplexer and an adder in the address bus between the pipeline buffer and the input address bus of the microsequencer.

The address bus multiplexer includes, as an additional selectable input, a sequence register which is loaded by the arithmetic logic unit to provide calculated addresses. Thus, this address bus multiplexer, in response to control signals from the microinstruction register, will select either the pipeline buffer or the sequence register as the source of the next address on the input address bus of the microsequencer.

The adder, which is connected to the output of this address bus multiplexer, and which is controlled by the microinstruction register, selectively adds the contents of a base register to the address supplied by the pipeline buffer or the sequence register. The base register is also loaded from the arithmetic logic unit and provides a base for offsetting the address provided from the address bus multiplexer.

As a consequence of this arrangement, addresses supplied to the microsequencer input address bus may be selected from the following alternatives: (a) the pipeline buffer; (b) the sequence register; (c) the base register plus the pipeline buffer; or (d) the base register plus the sequence register.

In addition, the multiplexer, which selects addresses from the pipeline buffer or the sequence register, is also connected to selectively provide addresses from a macroinstruction decode logic network to the microsequencer input address bus.

The selective addressing provided by the address bus multiplexer and adder operates, in addition to the incrementing, register, and register stack inputs provided by the microsequencer itself, to permit extremely flexible addressing of the control store. Thus, the address bus multiplexer and adder permit the following modes of control store addressing:

(A) The pipeline buffer alone will provide pure jump instructions, so that a microinstruction in the microinstruction register can directly specify the control store address of the next microinstruction to be fetched.

(B) The sequence register alone will permit the arithmetic logic unit to directly calculate jump addresses for the next microinstruction to be fetched.

(C) The pipeline buffer address, offset in the control store by the base register contents, will permit indirect jumps. Thus, a single pipeline buffer address, or series of pipeline buffer addresses, will effectively access multiple control store microinstructions or multiple series of control store microinstructions, through the loading of a variety of offsets in the base register. The base register is typically loaded to reflect the result of prior data manipulations in the arithmetic logic unit.

(D) The sequence register address, offset in the adder by the base register contents, will permit loop strings to be accessed in the control store by the arithmetic logic unit. Thus, by incrementing the sequence register repeatedly through a given address sequence, while periodically increasing the base register offset, the arithmetic logic unit can efficiently access multiple loops of microinstructions in the control store.

In addition, the input bus to the microsequencer is connected to an extremely fast micro-RAM which provides operand storage addressable with the same flexibility. A bit within the microinstruction in the microinstruction register identifies the address supplied on the address bus between the pipeline register and the microsequencer as an address for operands. Thus, the address bus multiplexer and adder permit the following modes of operand addressing:

(A) The pipeline buffer alone will provide direct micro-RAM calls from the microinstruction register.

(B) The sequence register alone will permit the arithmetic logic unit to directly calculate a micro-RAM address.

(C) The pipeline buffer address, offset by the base register contents, will permit the operand address in the microinstruction register to be offset. Thus, a single microinstruction, or a single series of microinstructions, can be used to access plural operands or plural series of operands in the micro-RAM, through the successive loading of a variety of offsets in the base register.

(D) As an extremely powerful operand addressing variant, the sequence register address, offset in the adder by the base register contents, the arithmetic logic unit can address two-dimensional data arrays in the micro-RAM. One dimension of the array is specified by the contents of the sequence register, while the other is specified by the base register.

As an additional feature, the microinstruction in the microinstruction register includes a bit which will force the microsequencer to automatically increment the control store address when an operand address is being supplied on the address bus. This permits the accessing of an operand through flexible addressing, as outlined above, and the accessing of a microinstruction from the control store to the microinstruction register in a single microcycle, so that the operand and the manipulative step to be undertaken in regard to that operand may be virtually simultaneously accessed, significantly reducing the through-put time of the microprocessor.

DESCRIPTION OF THE DRAWINGS

These and other advantages of the present invention are best understood through the following description which references the drawings in which.

DETAILED DESCRIPTION OF THE PREFERRED EMBODIMENT

Figure 1:
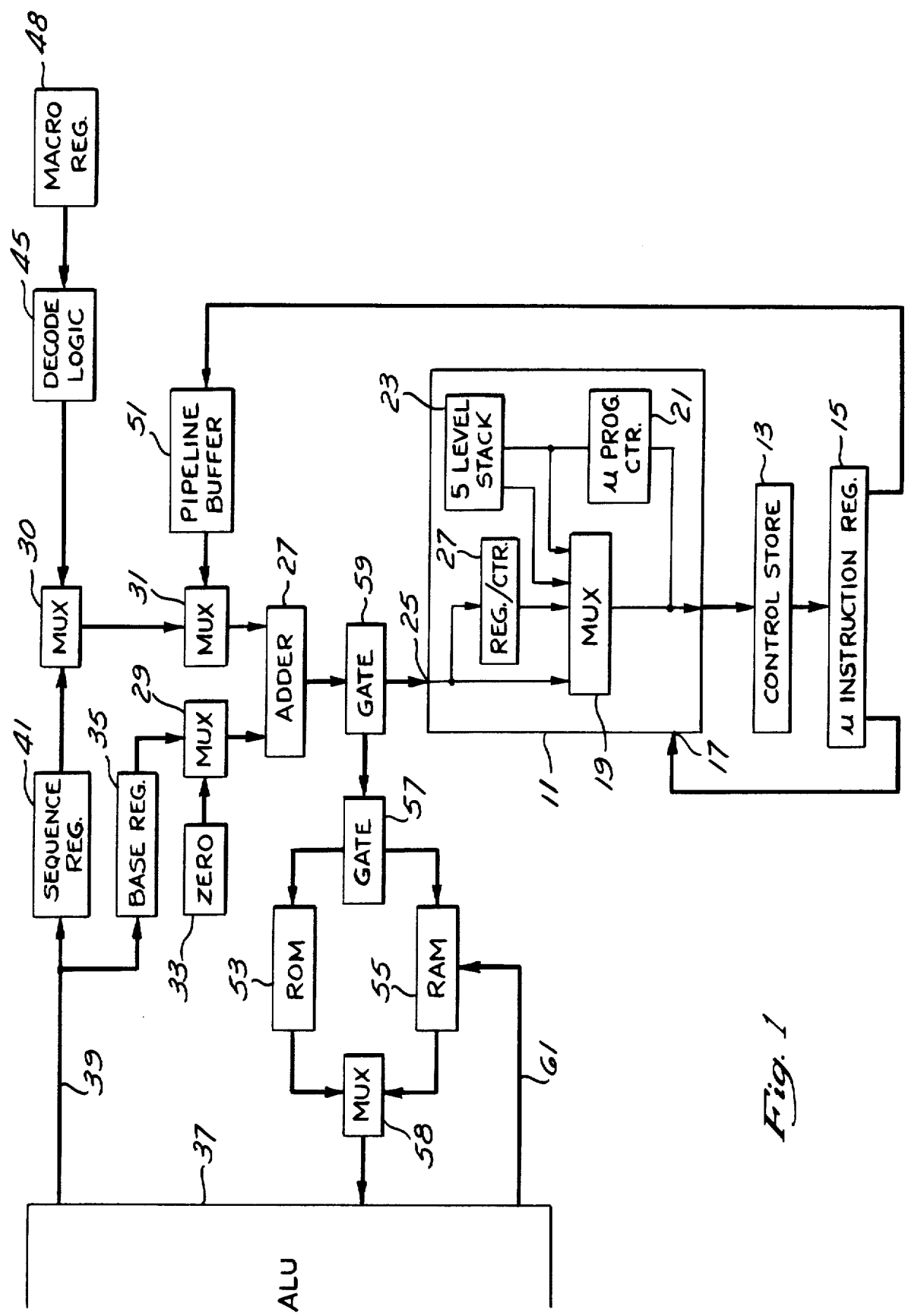
FIG. 1 is a block diagram schematic of the microprocessor of the present invention.

Referring initially to FIG. 1, the microprocessor of the present invention includes a microsequencer 11 used for addressing a control store 13 to provide microinstructions at a microinstruction register 15. It will be understood that these elements 11, 13, and 15 are common in the prior art and serve, in the prior art and in this invention, as the central core for the control system used in the microprocessor. The control store 13, in the preferred embodiment, is comprised of 2,048 40-bit words of read-only memory, each word being independently selectively addressable in response to a 12-bit address word supplied by the microsequencer 11. Control store words, when addressed, are placed in the microinstruction register 15. The microinstruction register 15 is hard wired to the various controllable elements within the microprocessor to permit execution of microinstructions.

In the preferred embodiment, the microsequencer 11 comprises a 2910 LSI chip, manufactured by Advanced Micro Devices. The microsequencer 11, in response to a 4-bit instruction input 17, provided by four bits in the microinstruction register 15, selects the next address microinstruction address from a number of sources. The selection is made by a multiplexer 19 from the following sources: (a) a microprogram counter 21 which increments the micro-address by one for sequential execution of microinstructions; (b) a 5-level register stack 23 which is connected to the microprogram counter 21 to store return addresses for micro-level subroutine calls. These return addresses permit a continued sequential sequence of microinstructions at the conclusion of a loop or branch instruction, and the multiple levels within the stack 23 permit the storage of return addresses for each of plural nested loops or branch instructions; (c) a tri-state bus 25 which provides external address sources to the microsequencer 11; and (d) a 12-bit register/counter 27 which is connected to the tri-state bus 25 and is utilized as an alternate address source or as a loop control counter, decremented to execute microinstructions repetitively.

In the present invention, the flexibility provided by the microsequencer 11 is augmented by generating the input addresses on the bus 25 from a plurality of sources. These sources are combined at a 12-bit adder 27 and a pair of multiplexers 29 and 31. The outputs of the multiplexers 29,31 are summed by the adder 27 to provide summed address signals on the bus 25.

The first of these multiplexers 29 is connected to select between a zero register 33 and a base register 35. The zero register 33, when selected, effectively disables the adder 27 by permitting the output of the multiplexer 31, added to zero, to propagate unchanged to the bus 25. When the base register 35 is selected by the multiplexer 29, its contents are added by the adder 27 to the output of multiplexer 31 to provide the sum of these words on the bus 25. The base register 35 is loaded from the arithmetic logic unit 37 by means of the main data bus 39. As will be understood more fully from the description which follows, the base register 35 stores base addresses which are offset by addresses provided by the multiplexer 31.

The main data bus 39 from the arithmetic logic unit 37 is additionally connected to a sequence register 41 which provides, at its output, one of two selectable inputs for a multiplexer 30. The sequence register is used to form a calculated address for the bus 25 either by itself, when the multiplexer 29 selects the zero register 33, or summed with the contents of the base register 35.

A second input to the multiplexer 30 is provided by the output of a decode logic network 45 which responds to a macroinstruction register 49 and provides a vectored input to the control store 11 for use in executing macroinstructions. The output of the multiplexer 30 provides a first input to the multiplexer 31.

A second input to the multiplexer 31 is provided by a pipeline buffer 51 which is connected to the twelve least-significant bits of the microinstruction register 15 to permit direct pipelining of jump instructions within the microinstruction in the register 15.

In regard to direct microsequence control, i.e., when the multiplexer 30 is set to select inputs from the sequence control, the two multiplexers 29 and 31 provide the flexible addressing capability of the present invention. Thus, through appropriate control of these multiplexers 29,31, the following address sources may be selectively connected to the bus 25: (a) pipeline buffer 51 (multiplexer 29 selects register 33, multiplexer 31 selects buffer 51); (b) sequence register 41 (multiplexer 29 selects register 33, multiplexer 31 selects register 41); (c) base register 35 plus sequence register 41 (multiplexer 29 selects register 35, multiplexer 31 selects register 41); and (d) base register 35 plus pipeline buffer 51 (multiplexer 29 selects register 35, multiplexer 31 selects buffer 51). These selections provide an extremely flexible address control for the microsequencer 11 of the present invention.

The present invention also permits this flexibly determined address on the bus 25 to be used for directly accessing operands to be written into or read from a micro-operand ROM 53 and a micro-RAM 55. The selective application of this address to the ROM 53 or RAM 55 is provided by a gate 57. Similarly, the selective application of the output word from the adder 27 to the microsequencer input bus 25 or the gate 57 is provided by a gate 59.

The micro-operand ROM 53 stores constants and literals as well as interrupt masks for the microprocessor. The micro-RAM 55 is a 4096 by 16-bit read/write memory utilized for local storage of operands for real time processing. Data read from the ROM 53 and RAM 55 is available through the data loop to the arithmetic logic unit 37 at the end of an operand read cycle, the output from these memories 53,55 being selectively provided to the data bus by a multiplexer 58. Data to be written into the micro-RAM 55 is provided on a bus 61 from the arithmetic logic unit 37.

Thus, the use of the adder 27 and multiplexers 29,31 provides the same flexible addressing capability for the ROM 53 and RAM 55 as was described above for the microsequencer 11. Furthermore, it can be seen that the micro-operand ROM 53 and micro-RAM 55 effectively form an operand memory within the control system of the microprocessor, in addition to the main memory of the microprocessor system. These combined features provide extremely high speed, flexibly addressed operand access for the microprocessor.

The present invention also permits the simultaneous accessing of a microinstruction from the control store 13, using an address previously stored in the microsequencer 11, and an operand from the ROM 53 or RAM 55, using an address from the bus 25, in a single micro step. This simultaneous accessing further increases the throughput speed of the microprocessor for real time applications.

Figure 2:
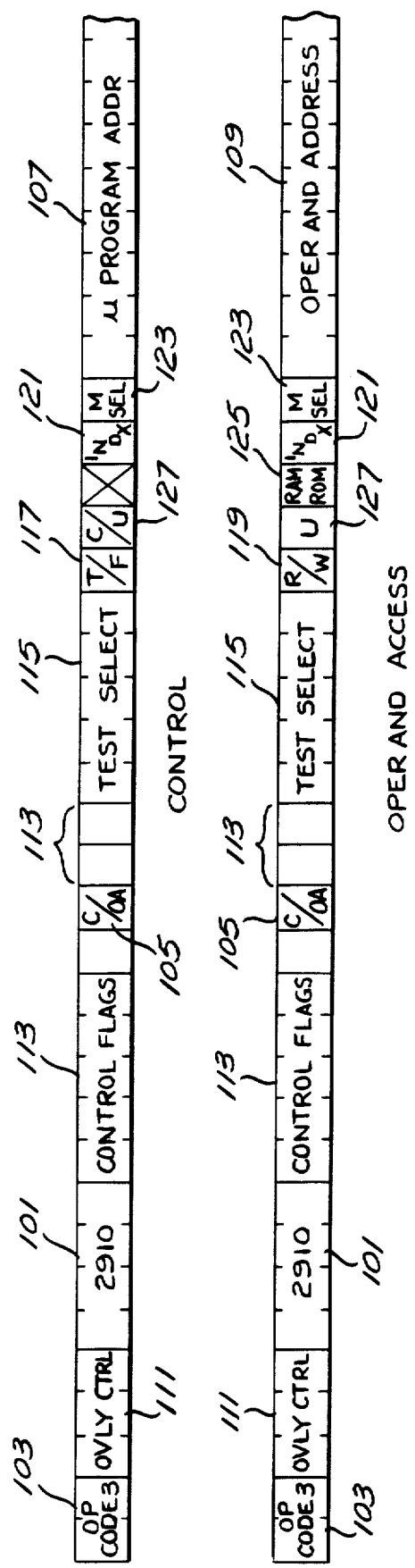
FIG. 2 is a graphic representation of the microinstructions provided by the microinstruction register of FIG. 1 during operand addressing and control store addressing modes for the microprocessor.

This feature, as well as the overall operation sequence of the control system of FIG. 1, is best understood through reference to the graphic representations of two microinstructions which may be placed in the microinstruction register 15, shown in FIG. 2. It will be understood that the microinstructions of FIG. 2 are accessed from the control store 13 and provide operational control and sequencing for the elements described above in reference to FIG. 1.

Thus, a 4-bit portion 101 of the microinstruction provides the input instruction 17 for the microsequencer 11, determining the address path within the microsequencer 11 for the next successive address to be accessed from the control store 13.

The initial two bits, 103 of the microinstruction, provide an op code which, if equal to the value 3, indicates that either a microinstruction from the control store 13 or an operand from the ROM 53 or RAM 55 is to be accessed in the next micro-cycle. Within op code 3 designations, a bit 105 is used to select either the control store, or operand storage. If this bit 105 is set to define an address in the control store 13, the last 12 bits 107 of op code 3 microinstructions will include a microprogram address for connection to the pipeline buffer 51. If, on the other hand, bit 105 is set to indicate the operand access variant of op code 3, the last twelve bits 109 provide an operand address for application to the pipeline buffer 51. Thus, although both of the microinstructions in FIG. 2 are designated op code 3, at bits 103, the first of these microinstructions is intended for use in selecting the next successive microinstruction address for the control store 13 whereas the second is used for selecting an operand address at the ROM 53 or RAM 55.

When the bit 105 is set to define an address in the control store 13, the gate 59 will selectively couple the output of the adder 27 to the input bus 25 of the microsequence control 11. Alternatively, if bit 105 specifies an operand address, the gate 59 will couple the address from the adder 27 to the gate 57.

Portions of the microinstruction format, which are not particularly relevant to the present invention, include a 3-bit overlay control field 111, which is used to select overlays which permit the mapping of selected fields of macroinstructions to various fields of microinstructions, thus limiting the number of micro code entry vectors required to implement macroinstruction emulation. In addition, a control flag field 113 permits the setting of control elements within the microprocessor for data and control signal routing. Finally, a test select field 115 is used to select test conditions to be used as qualifiers for conditional sequence control instructions or a conditional manipulation of control flags, the tests conducted being utilized to provide an additional input to the microprocessor 11. The bit 117 allows complimenting of the conditions selected by the test select bit 115 for using conventional sequence control instructions.

This same bit 119 in the microinstruction used for operand access provides a read or write selection at the micro-RAM 55 of FIG. 1. Thus, if bit 119 is set, a data word on the bus 61 of FIG. 1 will be stored in the RAM 55 at the address provided at the output of the gate 57. If the bit 119 is not set, data from the location in the RAM 55, selected by the address from the gate 57, will be output through the multiplexer 58 to the arithmetic logic unit 37.

Bit 121, in both of the microinstructions of FIG. 2, labeled indx, controls the multiplexer 29 of FIG. 1 to alternatively apply a zero value from the register 33 to the adder 27 or the value in the base register 35 to this adder 27. Thus, the bit 121 permits selective addition of the contents of the base register 35 to the output of the multiplexer 31.

A bit 123, labeled m sel, controls the multiplexer 31 of FIG. 1 to select either the jump field from the pipeline buffer 51 or the output of the sequence register 41 as the address source to the adder 27.

A bit 125, utilized in the operand access microinstruction of FIG. 2, but not in the control microinstruction, sets the gates 57 and 58 of FIG. 1 to permit the operand address 109 to selectively address the ROM 53 or RAM 55.

An important additional feature of the present invention is provided by the bit 127 which permits, when set, the unconditional execution of all sequence control instructions, without reference to external tests. As will be noted, in the operand access word, this bit 127 is always set. When set, the bit 127 requires that the address source, selected by the microsequencer instruction field 101, will automatically be used to fetch the next microinstruction from the control store 13.

During operand access, the operand in the ROM 53 or RAM 55 is addressed utilizing the output of the adder 27 while, in the same micro-cycle, the bit 127 and control field 101 permits the microsequencer 11 to fetch the next microinstruction in sequence within the control store 13, utilizing the microprogram counter 21. In this manner, both the operand and the next microinstruction to be fetched are addressed in a single micro-cycle. This eliminates the normal requirement that successive micro-cycles be used to address operands and to read or write the addressed operands at the addressed location. Thus, the next successive microinstruction selected during operand access will be a read or write instruction from the control store 13, available in the same micro-cycle as the operand.

It is important to note that the flexibility of addressing provided by the multiplexers 29 and 31 and the adder 27 is useful, not only in selecting microinstructions from the control store 13, but also for selecting operands from the ROM 53 and RAM 55. The importance of this flexibility in each instance is described below.

In the case of microinstruction selection, the use of the pipeline buffer 51 for jump instructions, and the use of a sequence register 41 to permit calculation by the arithmetic logic unit of a jump instructions, are well known. However, the use of an adder 27 to permit a base register 35, loaded from the arithmetic logic unit 37, to offset addresses from the pipeline buffer 51 or sequence register 41, has not been provided in prior art microprogram control systems. This addressing feature provides significant advantages. For example, if the control store 13 includes a series of jump tables, each including plural sequential jump instructions, the output of the pipeline buffer 51 may be used to sequence control of the microprocessor through the sequential jump instructions, while the output of the base register 35 may be used to select one of the plural jump tables. This permits the processing of a routine at either of the jump tables in response to a single microinstruction in the register 15, depending on the number previously stored in the base register 35.

Moreover, the use of the multiplexer 31 and adder 27 to permit the arithmetic logic unit 37 to calculate both the base in the register 35 and the offset in the sequence register 41 provides a very powerful sequencing mode for the microprocessor. Thus, using a first base number loaded in the base register 35, the arithmetic logic unit 37 can load the sequence register 41 to accomplish a predetermined loop of microinstructions. At a later time, by simply loading a new base in the register 35, the same looping sequence can be utilized in the register 41 to loop through a different set of microinstructions in the control store 13.

When used for operand access, the flexible addressing technique of the present invention provides extremely useful access to the ROM 53 and RAM 55. Thus, the address to these storage elements 53,55 may be provided directly by the pipeline buffer 51 or sequence register 41 for direct addressing by the microinstruction register 15 or arithmetic logic unit 37. In addition, by adding the value in the base register 35 to that in the pipeline buffer 51, the adder 27 will permit the reading or writing of multiple data structures, particularly in the micro-RAM 55. Thus, the same instruction sequence within the microinstruction register 55 can be used with each data structure, the location of the data structure within the micro-RAM 55 being offset by the value in the base register 35. This significantly reduces the number of microinstructions in the control store 13 required to access data in the micro-RAM 55.

Finally, the ability to add values in the sequence register 41 and base register 35, both loaded by the arithmetic logic unit 37, as a source for operand addresses in the micro-RAM 55, permits the accessing of two-dimensional data arrays within the micro-RAM 55. It will be understood, of course, that the micro-RAM 55 is actually one-dimensional. However, many applications for microprocessors require the manipulation of two-dimensional data. As an example, auto correlation algorithms, which require that each value in an array be subtracted from every other value to generate histograms for statistical analysis, are most easily handled as two-dimensional arrays. Another exemplary application is the computation required for a fast fourier transform algorithm.

If the number loaded into the base register 35 by the arithmetic logic unit 37 is considered the y axis, while the number loaded into the sequence register 41 is considered the x axis, the summation accomplished at the adder 27 can be used to uniquely address each data element within the RAM 55. It will be understood, of course, that the base address loaded into the register 35 will be multiples of the x dimension of the data array.

The provision, as explained above, for double indexed addressing of both operands and microinstructions, when combined with the ability to address operands utilizing the control store addressing bus, and the ability to simultaneously access operands and microinstructions in a single micro-cycle, yields an extremely fast and powerful microprocessor.

What is claimed is:

1. A processor, including an arithmetic logic unit and a microinstruction control store, comprising:
   a first register connected to be loaded solely from said arithmetic logic unit with a first micro-address word segment that forms a base number portion of a microinstruction address;

a second register, connected to be loaded solely from said arithmetic logic unit with a second micro-address word segment that forms an offset number portion of a microinstruction address;

means for adding said first and second micro-address word segments together to form a microinstruction address; and means responsive to said adding means for addressing said microinstruction control store to access a microinstruction which directly operates the hardward of said processor.

2. A processor, as defined in claim 1, additionally comprising:

an addressable operand memory; and means responsive to said adding means for addressing said addressable operand memory.

3. A processor, as defined in claim 2, additionally comprising:

alternate means for addressing said microinstruction control store; and means for addressing said microinstruction control store using said alternate addressing means while simultaneously adressing an operand in said operand memory using the output of said adding means.

4. A processor, as defined in claim 1, additionally comprising:

means responsive to one of said first and second registers for selectively addressing said microinstruction control store.

5. A processor, as defined in claim 1, additionally comprising:

means responsive to the output of said microinstruction control store for addressing said microinstruction control store.

6. A processor, as defined in claim 5, additionally comprising:

means for adding the micro-address word in one of said first and second registers to the output of said micro-instruction control store to produce a sum for addressing said micro-instruction control store.

7. A method of addressing an operand memory, and a control store which contains microinstructions which directly operate the hardware of a processor having an arithmetic logic unit and a pair of micro-address registers, comprising:

loading a different micro-address word, that forms a portion of a microinstruction address, into each of said pair of micro-address registers solely from said arithmetic logic unit;

adding the micro-address words in said pair of registers to produce a sum micro-address word;

adding to said sum micro-address word an additional memory select segment indicating whether said sum micro-address word is intended to be communicated to said operand memory or to said control store; and gating said sum micro-address word to either said control store or said operand memory in response to information in said memory select segment.

8. A method of addressing, as defined in claim 7, additionally comprising:

addressing an operand memory using said sum micro-address.

9. A method of addressing, as defined in claim 7, additionally comprising:

providing an alternate micro-address for said microinstruction control store by adding the micro-address word in one of said pair of registers to the output of said microinstruction control store.

10. A method of addressing, as defined in claim 7, additionally comprising:

providing an alternate micro-address for said microinstruction control store from one of said different micro-address words in said pair of address registers.

11. A processor, including an arithmetic logic unit and a microinstruction control store, comprising:

a first addressable register connected to be loaded solely from said arithmetic logic unit with a first micro-address word segment that forms a base number portion of a microinstruction address;

a second addressable register, connected to be loaded solely from said arithmetic logic unit with a second micro-address word segment that forms an offset number portion of a microinstruction address;

means for adding said first and second micro-address word segments together to form a microinstruction address;

means responsive to said adding means for addressing said microinstruction control store to access a sequence of microinstructions which directly operate the hardward of said processor; and means for reloading said first register with a third micro-address word segment to alter said microinstruction address and thereby offset the micro instruction sequence accessed in the control store.

12. A processor, including an arithmetic logic unit and a microinstruction control store, as defined in claim 1, further comprising means for reloading said first register with a third micro-address word segment to alter said microinstruction address and thereby offset the microinstruction sequence accessed in the control store.

* * * * *